(12) United States Patent
Wang (10) Patent No.: US 11,475,897 B2
(45) Date of Patent: Oct. 18, 2022

(54) METHOD AND APPARATUS FOR RESPONSE USING VOICE MATCHING USER CATEGORY

(71) Applicant: Baidu Online Network Technology (Beijing) Co., Ltd., Beijing (CN)

(72) Inventor: Wenyu Wang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 195 days.

(21) Appl. No.: 16/505,648

(22) Filed: Jul. 8, 2019

(65) Prior Publication Data
US 2020/0075024 A1 Mar. 5, 2020

(30) Foreign Application Priority Data
Aug. 30, 2018 (CN) .......................... 201811000038.3

(51) Int. Cl.
*G10L 17/00* (2013.01)
*G10L 17/06* (2013.01)
*G10L 13/00* (2006.01)

(52) U.S. Cl.
CPC .............. *G10L 17/00* (2013.01); *G10L 13/00* (2013.01); *G10L 17/06* (2013.01)

(58) Field of Classification Search
CPC ....................................................... G06F 3/167
USPC .................................. 704/231–257, 270–275
See application file for complete search history.

(56) References Cited

U.S. PATENT DOCUMENTS

| | | | | |
|---|---|---|---|---|
| 6,466,654 B1* | 10/2002 | Cooper | .................. | G10L 15/26 379/88.16 |
| 6,665,644 B1 | 12/2003 | Kanevsky et al. | | |
| 9,343,064 B2* | 5/2016 | Cross, Jr. | ................ | G10L 13/00 |
| 9,633,660 B2* | 4/2017 | Haughay | ................ | G10L 17/08 |
| 10,311,858 B1* | 6/2019 | Mont-Reynaud | ..... | G06F 40/211 |
| 2001/0041977 A1* | 11/2001 | Aoyagi | ..................... | G06F 3/16 704/246 |
| 2003/0046080 A1* | 3/2003 | Hejna, Jr. | ................ | G09B 5/06 704/270 |
| 2009/0232296 A1* | 9/2009 | Jaiswal | ................... | H04M 3/54 379/265.12 |
| 2009/0326947 A1* | 12/2009 | Arnold | .................... | G06Q 30/02 704/257 |
| 2013/0304730 A1* | 11/2013 | Zhou | ................. | G06F 16/90335 707/723 |
| 2014/0046876 A1* | 2/2014 | Zhang | ................. | G06F 16/3329 706/11 |
| 2015/0220513 A1* | 8/2015 | Lyman | .................... | G10L 15/18 704/9 |

(Continued)

FOREIGN PATENT DOCUMENTS

| | | |
|---|---|---|
| CN | 103187051 A | 7/2013 |
| CN | 103236259 A | 8/2013 |

(Continued)

*Primary Examiner* — Jesse S Pullias
(74) *Attorney, Agent, or Firm* — Lathrop GPM LLP (57) ABSTRACT

A response method and an apparatus thereof are provided. The method includes: receiving voice information sent through a client by a user; determining, based on the voice information, a user category to which the user belongs; and using voice matching the user category to respond to the voice information. Accordingly, response voice matches the user category of the user, which implements that the response is performed using the response voice targeted for the user category, and thus, the user experience may be improved.

12 Claims, 5 Drawing Sheets

(56) References Cited

U.S. PATENT DOCUMENTS

| | | | | |
|---|---|---|---|---|
| 2015/0269931 A1* | 9/2015 | Senior | ................... | G10L 15/063 |
| | | | | 704/245 |
| 2015/0314454 A1* | 11/2015 | Breazeal | ................ | B25J 9/0003 |
| | | | | 700/259 |
| 2015/0339321 A1* | 11/2015 | Butler | ................... | H04L 67/306 |
| | | | | 382/115 |
| 2018/0122361 A1* | 5/2018 | Silveira Ocampo | ......................... | |
| | | | | G10L 13/0335 |
| 2018/0308487 A1* | 10/2018 | Goel | ....................... | G10L 15/26 |

FOREIGN PATENT DOCUMENTS

| | | | |
|---|---|---|---|
| CN | 106027485 | A | 10/2016 |
| CN | 107170456 | A | 9/2017 |
| CN | 107358949 | A | 11/2017 |
| CN | 107832720 | A | 3/2018 |
| CN | 108037905 | A | 5/2018 |
| CN | 108366302 | A | 8/2018 |
| CN | 108388638 | A | 8/2018 |
| CN | 110069608 | A | 7/2019 |
| JP | 2002041084 | A | 2/2002 |
| JP | 2004109323 | A | 4/2004 |
| JP | 2007272773 | A | 10/2007 |
| JP | 2010078763 | A | 4/2010 |
| JP | 2014002383 | A | 1/2014 |
| JP | 2015119298 | A | 6/2015 |
| JP | 2017062602 | A | 3/2017 |
| JP | 2017176728 | A | 10/2017 |
| JP | 2018081169 | A | 5/2018 |
| WO | WO2017147081 | A1 | 8/2017 |

\* cited by examiner

METHOD AND APPARATUS FOR RESPONSE USING VOICE MATCHING USER CATEGORY

CROSS-REFERENCE TO RELATED APPLICATIONS

This application claims priority to Chinese Patent Application No. 201811000038.3, filed on Aug. 30, 2018, titled "Response Method and Apparatus thereof," which is hereby incorporated by reference in its entirety.

TECHNICAL FIELD

Embodiments of the present disclosure relate to the field of computer technology, specifically to the field of Internet technology, and specifically to a response method and an apparatus thereof.

BACKGROUND

With the development of artificial intelligence technology, smart speakers with screens as well as smart sound systems are gradually being used by a vast number of users.

A user may send an information acquisition command to the above smart speakers with screens and the above smart sound systems by voice. The smart speakers with screens and the smart sound systems play audio or video information to the user according to the information acquisition command of the user.

SUMMARY

Embodiments of the present disclosure propose a response method and an apparatus thereof.

In a first aspect, the embodiments of the present disclosure provide a response method. The method includes: receiving voice information sent through a client by a user; determining, based on the voice information, a user category to which the user belongs; and using voice matching the user category to respond to the voice information.

In some embodiments, the determining, based on the voice information, a user category to which the user belongs includes: performing a voiceprint recognition on the voice information, and determining the user category to which the user belongs according to the recognition result.

In some embodiments, the determining, based on the voice information, a user category to which the user belongs includes: inputting the voice information into a pre-trained user category recognition model, and determining the user category to which the user belongs according to an output of the user category recognition model.

In some embodiments, the using voice matching the user category to respond to the voice information includes: analyzing semantics of the voice information; determining response information matching the semantics; and playing the response information using the voice.

In some embodiments, the using voice matching the user category to respond to the voice information includes: determining whether the voice information includes a polite term; and playing, in response to determining the voice information including the polite term, a preset polite term using the voice.

In some embodiments, the voice refers to synthetic voice or pre-recorded voice, and the synthetic voice is synthesized based on a voice parameter matching the user category.

In some embodiments, the user category refers to a child user, and the method further includes: pushing multimedia information matching the child user to the user.

In a second aspect, the embodiments of the present disclosure provide a response apparatus. The apparatus includes: a receiving unit, configured to receive voice information sent through a client by a user; a determining unit, configured to determine, based on the voice information, a user category to which the user belongs; and a response unit, configured to use voice matching the user category to respond to the voice information.

In some embodiments, the determining unit is further configured to: perform a voiceprint recognition on the voice information, and determine the user category to which the user belongs according to the recognition result.

In some embodiments, the determining unit is further configured to: input the voice information into a pre-trained user category recognition model, and determine the user category to which the user belongs according to an output of the user category recognition model.

In some embodiments, the response unit is further configured to: analyze semantics of the voice information; determine response information matching the semantics; and play the response information using the voice.

In some embodiments, the response unit is further configured to: determine whether the voice information includes a polite term; and play, in response to determining the voice information including the polite term, a preset polite term using the voice.

In some embodiments, the voice refers to synthetic voice or pre-recorded voice, and the synthetic voice is synthesized based on a voice parameter matching the user category.

In some embodiments, the user category refers to a child user, and the apparatus further includes a pushing unit, configured to: push multimedia information matching the child user to the user.

In a third aspect, the embodiments of the present disclosure provide an electronic device. The electronic device includes: one or more processors; and a storage device, configured to store one or more programs. The one or more programs, when executed by the one or more processors, cause the one or more processors to implement the method described in any implementation in the first aspect.

In a fourth aspect, the embodiments of the present disclosure provide a computer readable medium storing a computer program. The program, when executed by a processor, implements the method described in any implementation in the first aspect.

According to the method and response apparatus provided by the embodiments of the present disclosure, the voice information sent through the client by the user is received, the user category to which the user belongs is then determined based on the voice information, and finally, the voice information is responded using the voice matching the user category. Accordingly, the response voice matches the user category of the user, which implements that the response is made using the response voice targeted for the user category, and thus, the user experience may be improved.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

The present disclosure will be described below in detail with reference to the accompanying drawings and in combination with the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
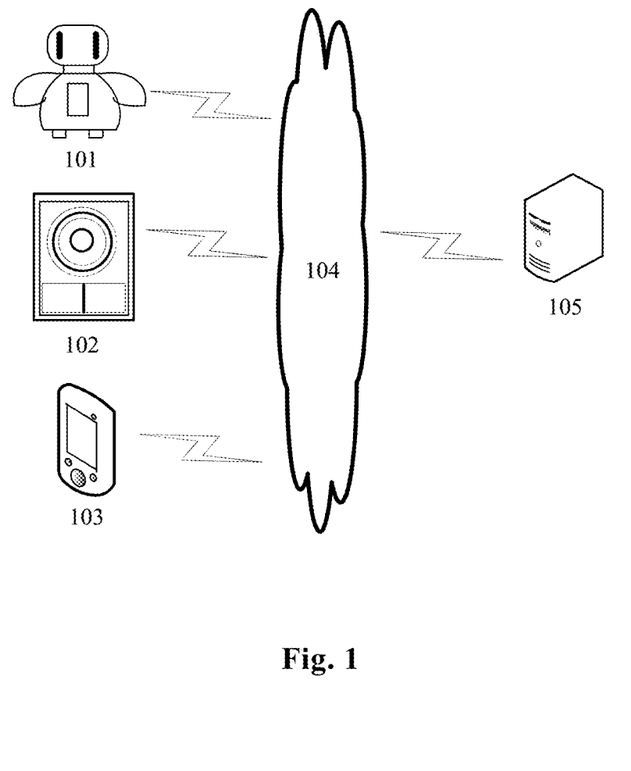
FIG. 1 is a diagram of an exemplary system architecture in which a response method according to an embodiment of the present disclosure may be applied.

FIG. 1 shows an exemplary system architecture 100 in which a response method according to an embodiment of the present disclosure may be applied.

As shown in FIG. 1, the system architecture 100 may include terminal devices 101, 102 and 103, a network 104, and a server 105. The network 104 serves as a medium providing a communication link between the terminal devices 101, 102 and 103 and the server 105. The network 104 may include various types of connections, for example, wired or wireless communication links, or optical fiber cables.

A user may interact with the server 105 via the network 104 using the terminal devices 101, 102 and 103, to receive or send messages. Various client applications (e.g., multimedia information playing applications, search applications and instant communication tools) may be installed on the terminal devices 101, 102 and 103.

The terminal devices 101, 102 and 103 may be hardware or software. When being the hardware, the terminal devices 101, 102 and 103 may be various electronic devices having a display screen and supporting playing of multimedia information, which include, but not limited to, a smart phone, a smart robot, a smart speaker, a smart speaker with a screen, a wearable device, a tablet computer, an e-book reader, an MP3 player (Moving Picture Experts Group Audio Layer III), an MP4 (Moving Picture Experts Group Audio Layer IV) player, a laptop portable computer, a desktop computer, etc. When being the software, the terminal devices 101, 102 and 103 may be installed in the above listed electronic devices. The terminal devices may be implemented as a plurality of pieces of software or a plurality of software modules (e.g., software or software modules for providing a distributed database service), or as a single piece of software or a single software module, which will not be specifically defined here.

The server 105 may provide various services. For example, the server 105 may receive the voice information of a user sent by the terminal devices 101, 102 and 103, analyze the voice information, and respond to the voice information according to the processing result (e.g., the user category of the user).

It should be noted that the response method provided by the embodiments of the present disclosure is generally performed by the server 105. Correspondingly, the response apparatus is generally provided in the server 105.

It should be noted that the server may be hardware or software. When being the hardware, the server may be implemented as a distributed server cluster composed of a plurality of servers, or as a single server. When being the software, the server may be implemented as a plurality of pieces of software or a plurality of software modules (e.g., software or software modules for providing a distributed service), or as a single piece of software or a single software module, which will not be specifically defined here.

It should be appreciated that the numbers of the terminal devices, the networks, and the servers in FIG. 1 are merely illustrative. Any number of terminal devices, networks, and servers may be provided based on actual requirements.

Figure 2:
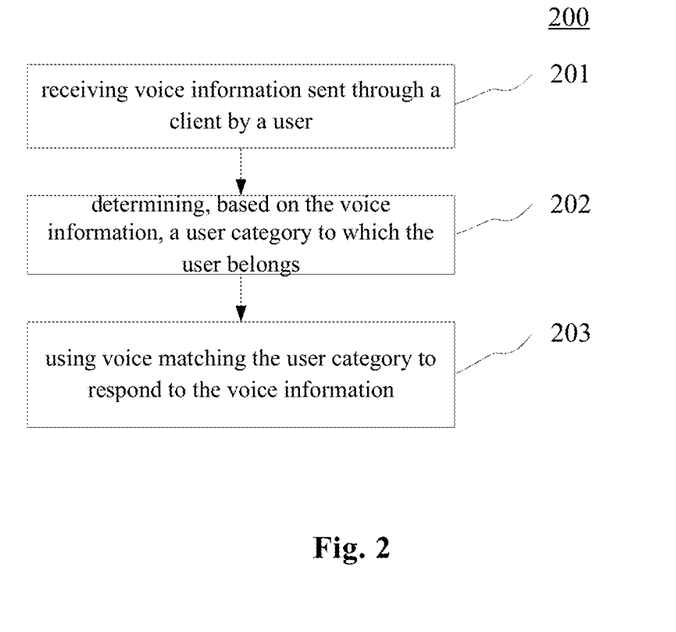
FIG. 2 is a flowchart of an embodiment of the response method according to the present disclosure.

Further referring to FIG. 2, FIG. 2 illustrates a flow 200 of an embodiment of a response method according to the present disclosure. The response method includes the following steps 201 to 203.

Step 201 includes receiving voice information sent through a client by a user.

In this embodiment, an executing body (e.g., the server shown in FIG. 1) of the response method may receive the voice information by means of a wired connection or a wireless connection, the voice information being sent by the user through the client provided in a terminal device (e.g., the terminal device shown in FIG. 1).

Smart voice interaction is a new generation of human-machine interaction mode based on voice inputs. People may obtain feedback information by speaking. Generally, people may use a smart voice device capable of implementing the smart voice interaction, to obtain corresponding feedback information by inputting voice to the smart voice device.

In practice, a smart voice device (e.g., a smart speaker) may provide a voice service for a plurality of users. For example, if the smart voice device is used by a family, the smart voice device may provide the voice service for a plurality of family members. If the smart voice device is used in a public place, the smart voice device may provide the voice service for a plurality of users.

In this embodiment, the user may send the voice information to the terminal device, and the client of the terminal device may receive the voice information sent by the user.

Here, the above voice information may include a preset wake-up word. For example, the wake-up word may include a name pre-defined for the client, and the like.

Step 202 includes determining, based on the voice information, a user category to which the user belongs.

In this embodiment, based on the voice information of the user obtained in step 201, the executing body (e.g., the server shown in FIG. 1) may analyze the voice information using various analysis approaches, to determine the user category to which the user belongs.

In this embodiment, the user may be classified by age or may be classified by gender or the like. Correspondingly, the user categories may include: child user, youth user, middle-aged user, and elderly user. The user categories may alternatively include male user and female user. The user category here may be set as needed.

The description is performed below by taking the user categories divided into the child user, the youth user, the middle-aged user and the elderly user as an example. Here, the user categories divided into the child user, the youth user, the middle-aged user and the elderly user may respectively correspond to user groups in different age ranges. The age ranges corresponding to the child user, the youth user, the middle-aged user and the elderly user may be set according to specific applications, which are not defined here.

In some alternative implementations of this embodiment, the determining, based on the voice information, a user category to which the user belongs may include: performing a voiceprint recognition on the voice information, and determining the user category according to the voiceprint recognition result.

Voice is one of the natural attributes of human beings, and the voice of each person has personal acoustic characteristics. These acoustic characteristics are mainly determined by physiological characteristics of a lung, a trachea, a larynx, a pharynx, a nose, a mouth or the like of a speaker.

A voiceprint is a sound wave spectrum carrying voice information and displayed by an electro acoustical instrument. The acoustic characteristics of the user may be extracted from the voiceprint.

Voiceprint recognition is one of biometric identification technologies. The voiceprint recognition may extract the acoustic characteristics of the speaker by sound, determine the identity of the speaker according to the acoustic characteristics, and determine the age range corresponding to the speaker.

People in the same age range may have relatively close physiological characteristics, such that people in the same age range may have similar acoustic characteristics. Statistics may be performed to acquire a characteristic parameter interval corresponding to the acoustic characteristics having a commonality for a plurality of users in each age range in advance.

In these alternative implementations, the executing body may perform the voiceprint recognition on the voice information, and determine the user category according to the voiceprint recognition result.

The voiceprint recognition described above may include extracting a characteristic value of the acoustic characteristics of the user from the voice information of the user. Then, the extracted characteristic value of the acoustic characteristics of the user is compared with pre-extracted characteristic parameter intervals of the acoustic characteristics corresponding to various age ranges. The age range corresponding to the characteristic parameter interval including the characteristic value of the acoustic characteristics of the user is used as the age range corresponding to the user. The user category of the user is then determined according to the determined age range corresponding to the user.

The above acoustic characteristics may include at least one of a time length, a fundamental frequency, energy, a formant frequency, wideband, a frequency perturbation, an amplitude perturbation, a zero-crossing rate, or a Mel frequency cepstral parameter.

In some alternative implementations of this embodiment, the determining, based on the voice information, a user category to which the user belongs may include: inputting the voice information into a pre-trained user category recognition model, and determining the user category to which the user belongs according to an output of the user category recognition model.

In these alternative implementations, the pre-trained user category recognition model may be set in the executing body, or the executing body may access the pre-trained user category recognition model via the network. The user category recognition model may output an output result indicating the user category to which the user belongs, according to the inputted voice information of the user.

The user category recognition model may be various machine learning models, for example, a decision tree model, a selection tree model and a neural network model.

For example, the user categories may include the child user, the youth user, the middle-aged user, and the elderly user; or include the male user and the female user.

It may be understood that the user category recognition model may be obtained by pre-training an initial user category recognition model using massive voice information to which user category annotations are added.

It should be noted that the method for training the machine learning model is a well-known technology studied and applied widely at present, which will not be repeatedly described here.

Step 203 includes using voice matching the user category to respond to the voice information.

In this embodiment, the executing body may determine the voice matching the user category using various methods, to respond to the voice information of the user.

In this embodiment, for each user category, the statistics of the response voice preferred by the user category may be performed in advance. In this way, the executing body may pre-store the user categories and the response voice preferred respectively by the user categories. Alternatively, the executing body may access the user categories and the response voice preferred respectively by the user categories stored in other electronic devices through the network.

In some alternative implementations of this embodiment, the voice matching the user category refers to synthetic voice or pre-recorded voice. That is, in these alternative implementations, according to the user category obtained in step 202, the executing body of the response method may make a response to the voice information using the synthetic voice synthesized based on a voice parameter matching the user category. The executing body may alternatively make a response to the voice information using the pre-recorded voice matching the user category.

In some application scenarios, the voice matching the user category may be synthesized based on the voice parameter matching the user category. In these application scenarios, the user categories and the voice parameters corresponding to the response voices respectively preferred by the user categories may be pre-stored in the executing body. The executing body may access the user categories and the voice parameters corresponding to the response voices respectively preferred by the user categories stored in other electronic devices through the network.

For example, the above voice parameters may include, but not limited to, at least one of a spectrum, a fundamental frequency, a time length, a pitch, a sound length, or a sound intensity.

In these application scenarios, after determining the user category of the user in step 202, the executing body may extract the voice parameter corresponding to the user category from the voice parameters corresponding to the user categories, and then apply the voice parameter to a voice synthesis technique, to obtain the synthetic voice synthesized according to the above voice parameter. The voice information is responded using the synthetic voice.

Voice synthesis refers to the technique of converting any text into voice, which is an indispensable module for human-machine interaction.

In these application scenarios, a plurality of response texts may be preset in the executing body. The executing body may convert the response texts into synthetic voice and respond to the voice information of the user.

In this embodiment, if the user category is the child user, the voice parameter may be set to a voice parameter matching children. According to the voice parameter matching the child user, the voice synthesized using the voice synthesis technique may sound identical or similar to the true voice of the children, thereby increasing the affinity of the response voice to the child user.

Similarly, if the user category is the elderly user, the voice parameter may be set to a voice parameter of the voice preferred by elderly users, the preferred voice being obtained through statistics.

That is, the executing body may select the voice parameter corresponding to the user category according to the category of the user, thereby generating the synthetic voice matching the user category, and respond to the voice information of the user using the synthetic voice corresponding to the user category. Accordingly, it is implemented that the response is made using the response voice targeted for the user category, and thus, the user experience may be improved.

In other application scenarios, the voice matching the user category may be the pre-recorded voice. In these application scenarios, for each user category, the voice of a real person that matches the user category may be pre-recorded. In this way, pre-recorded real voices respectively matching the user categories may be obtained. The pre-recorded real voices respectively matching the user categories may be saved in the executing body; or the executing body may access the pre-recorded real voices respectively matching the user categories set in other electronic devices through the network. In these application scenarios, after determining the user category of the user in step 202, the executing body may select, from the pre-recorded real voices respectively matching the user categories, the pre-recorded real voice matching the user category determined in step 202, to respond to the voice information of the user.

Figure 3:
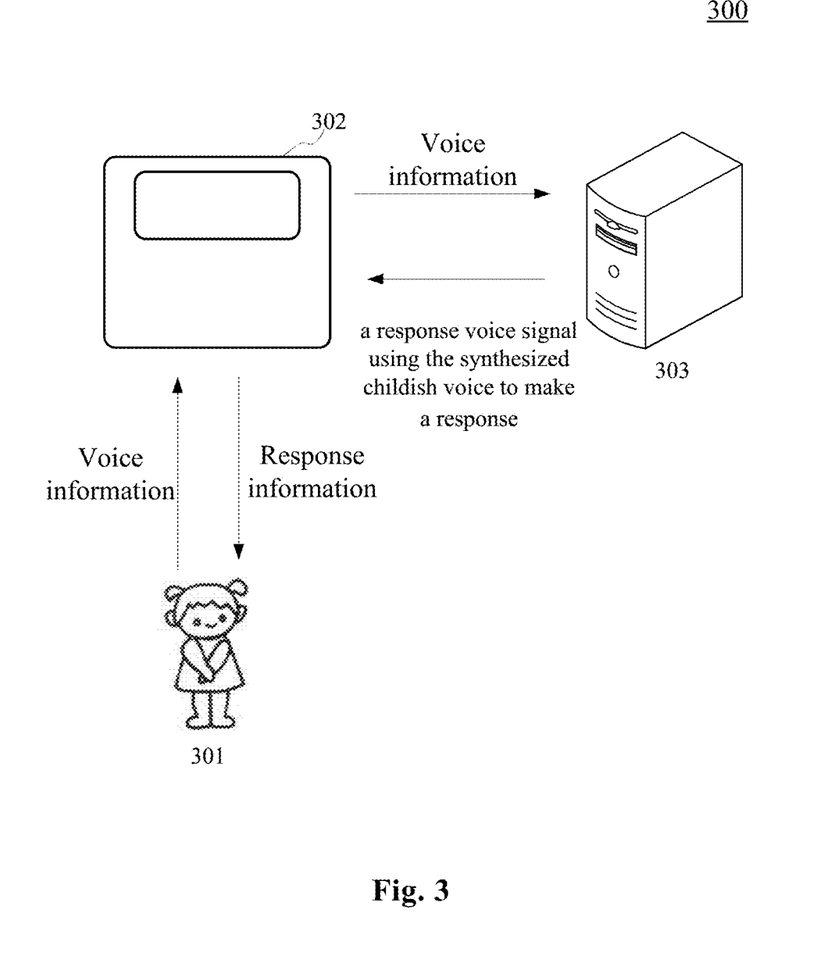
FIG. 3 is a schematic diagram of an application scenario of the response method according to the present disclosure.

Further referring to FIG. 3, FIG. 3 is a schematic diagram 300 of an application scenario of the response method according to this embodiment. In the application scenario of FIG. 3, the child user 301 may send voice information to the terminal device 302 to wake up the terminal device. The terminal device 302 may send the above voice information to the server 303. The server 303 may first receive the voice information sent through the terminal device 302 by the child user 301. Then, based on the voice information, the server 303 may determine that the user category to which the child user 301 belongs is child user. The server 303 may then synthesize the synthesized childish voice using a voice parameter matching the child user, and respond to the above voice information using the synthesized childish voice. Next, the server 303 sends a response voice signal using the synthesized childish voice to make a response, to the terminal device 302. Finally, the terminal device 302 plays the response voice corresponding to the response voice signal to the child user 301.

According to the method provided by the foregoing embodiment of the present disclosure, the voice information sent through the client by the user is received. Then, the user category to which the user belongs is determined based on the voice information. Finally, the voice information is responded using the synthetic voice synthesized based on the voice parameter matching the user category. Accordingly, the response voice matches the user category of the user, which implements that the response is performed using the response voice targeted for the user category, and thus, the user experience may be improved.

In some alternative implementations of this embodiment, the using voice matching the user category to respond to the voice information in step 203 includes the following sub-steps 2031 and 2032.

Sub-step 2031 includes analyzing semantics of the voice information.

In these alternative implementations, the executing body may analyze the semantics of the voice information using various methods. As an example, the executing body may analyze the semantics of the voice information through the following steps. First, the executing body may perform a voice recognition on the voice information to obtain text information corresponding to the voice information. Then, the text information is analyzed using various semantic analysis approaches (e.g., word segmentation, part-of-speech tagging, and named entity recognition), thereby obtaining the semantics corresponding to the text information.

It should be noted that analyzing the semantics of the voice information is a well-known technology studied and applied widely at present, which will not be repeatedly described here.

Sub-step 2032 includes determining response information matching the semantics.

In some application scenarios, the executing body may pre-store a response information table. A plurality of semantics and pieces of response information respectively corresponding thereto may be associated and stored in the response information table. The response information here may include a response text.

In other application scenarios, the executing body may acquire a plurality of pieces of chat information from the Internet. A plurality of pieces of conversation information including semantics identical or similar to the above semantics are determined from the chat information, and then the response information matching the above semantics is extracted from the plurality of pieces of conversation information.

Sub-step 2033 includes playing the response information using the voice.

In these alternative implementations, the executing body may generate the synthetic voice using the voice parameter matching the category of the user, and play the response information using the synthetic voice. Alternatively, the executing body plays the response information using the pre-recorded voice matching the user category.

In these alternative implementations, according to the semantics corresponding to the voice information, the response is made using the voice matching the category of the user, such that the response information matches the needs of the user. On the one hand, the accuracy of the response information may be improved. On the other hand, the satisfaction of the user may be further improved.

In some alternative implementations of this embodiment, the using voice matching the user category to respond to the voice information in step 203 may further include the following sub-steps 2034 and 2035.

Sub-step 2034 includes determining whether the voice information includes a polite term.

In this embodiment, the executing body may determine whether the voice information includes the polite term using various methods.

As an example, the executing body may determine whether the voice information of the user includes the polite term according to the following steps. First, the executing body may perform the voice recognition on the voice information to obtain the text information corresponding to the voice information. Then, the executing body may match each polite term in a preset polite term table with the text information. If the matching is successful, it is determined that the voice information of the user includes the polite term. Further, the executing body may also determine which polite term or what polite terms are included in the voice information.

The above polite term table may include a plurality of polite terms. The polite term may refer to a word, words or a phrase.

The preset polite term table may be provided in the executing body, or may be provided in other electronic devices communicated with the executing body via the network.

Sub-step 2035 includes playing, in response to determining the voice information including the polite term, a preset polite term using the voice.

In these alternative implementations, the executing body may preset a corresponding response polite term for each polite term. For example, if the user uses the polite term "excuse me," the corresponding preset polite term may be "thank you for your elegant question." The executing body may generate the synthetic voice using the voice parameter matching the user category, and use the synthetic voice to play the preset polite term for response. The executing body may alternatively play the preset polite term for response using the pre-recorded voice matching the user category.

In these alternative implementations, if the user category is the child user, it may be conducive to cultivating the habit of the child user to use the polite term in language communication. If the user is the youth user, the middle-aged user or the elderly user, it may be conducive to improving the affinity of the response information to the user.

Figure 4:
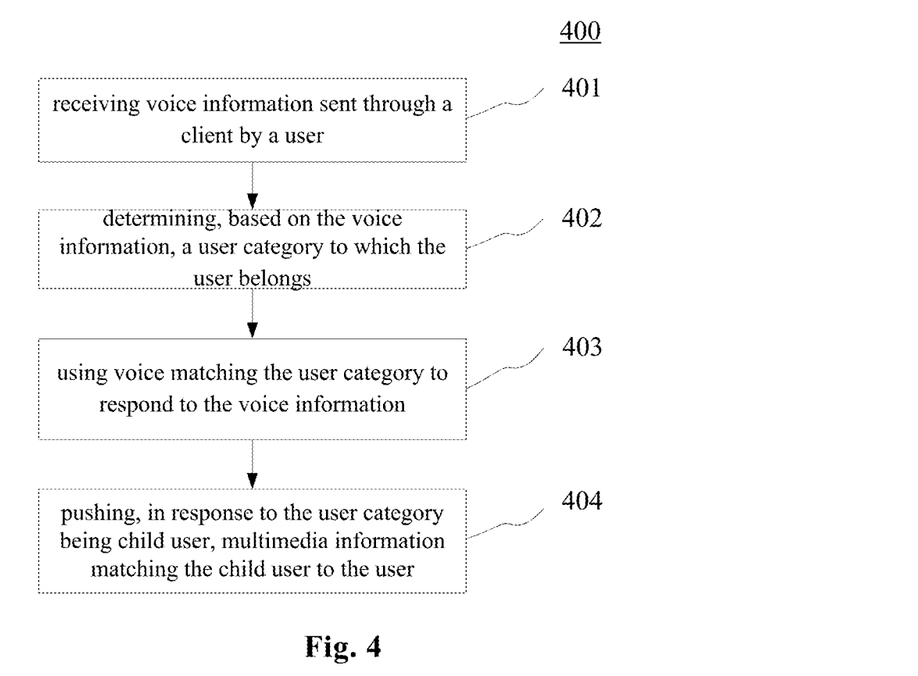
FIG. 4 is a flowchart of another embodiment of the response method according to the present disclosure.

Further referring to FIG. 4, FIG. 4 illustrates a flow 400 of another embodiment of the response method. The flow 400 of the response method includes the following steps 401 to 404.

Step 401 includes receiving voice information sent through a client by a user.

In this embodiment, step 401 is the same as step 201 shown in FIG. 2, which will not be repeatedly described here.

Step 402 includes determining, based on the voice information, a user category to which the user belongs.

In this embodiment, step 402 is the same as step 202 shown in FIG. 2, which will not be repeatedly described here.

Step 403 includes using voice matching the user category to respond to the voice information.

In this embodiment, step 403 is the same as step 203 shown in FIG. 2, which will not be repeatedly described here.

Step 404 includes pushing, in response to the user category being child user, multimedia information matching the child user to the user.

In this embodiment, the user category may be the child user.

The executing body may acquire the multimedia information corresponding to the child user by various means, for example, animations, children's songs, and children's stories.

For example, the multimedia information corresponding to the child user may be pre-stored in the executing body. Alternatively, the executing body may access the multimedia information matching the child user through the network, the multimedia information being set in other electronic devices.

The above multimedia information matching the child user may be pre-stored multimedia information. The multimedia information may be, for example, multimedia information obtained by performing statistics on a large number of child users online or offline.

In some application scenarios, if the user category is the child user, the executing body may automatically shield social information, violence information, pornographic information, and the like.

It may be seen from FIG. 4 that, as compared with the embodiment corresponding to FIG. 2, the flow 400 of the response method in this embodiment emphasizes the step of pushing the multimedia information matching the child user to the child user. Therefore, pushing the information to the user meets the needs of the user, and thus, the pushing of the information with pertinence is implemented.

Figure 5:
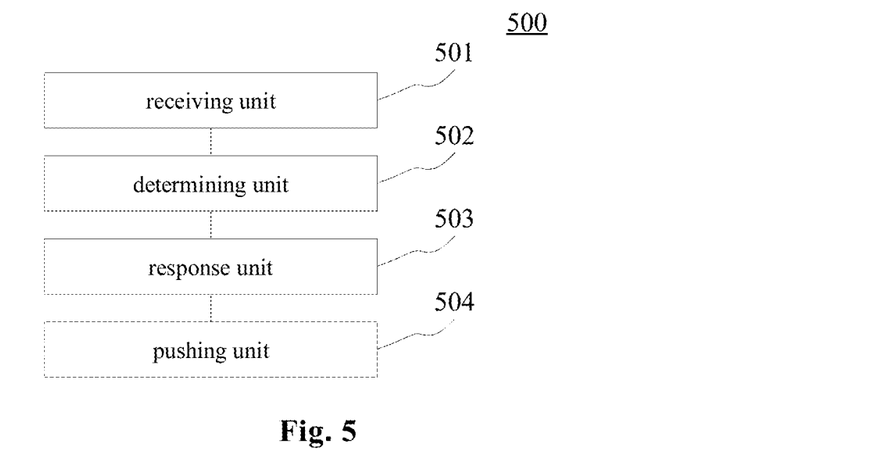
FIG. 5 is a schematic structural diagram of a response apparatus according to the present disclosure.

Further referring to FIG. 5, as an implementation of the method shown in the above drawings, the present disclosure provides an embodiment of a response apparatus. The embodiment of the apparatus corresponds to the embodiment of the method shown in FIG. 2, and the apparatus may be applied in various electronic devices.

As shown in FIG. 5, the response apparatus 500 in this embodiment includes: a receiving unit 501, a determining unit 502 and a response unit 503. The receiving unit 501 is configured to receive voice information sent through a client by a user. The determining unit 502 is configured to determine, based on the voice information, a user category to which the user belongs. The response unit 503 is configured to use voice matching the user category to respond to the voice information.

In this embodiment, for specific processes of the receiving unit 501, the determining unit 502 and the response unit 503 in the response apparatus 500, and their technical effects, reference may be made to relative descriptions of step 201, step 202 and step 203 in the corresponding embodiment of FIG. 2 respectively, which will not be repeatedly described here.

In some alternative implementations of this embodiment, the determining unit 502 is further configured to: perform a voiceprint recognition on the voice information, and determine the user category to which the user belongs according to the recognition result.

In some alternative implementations of this embodiment, the determining unit 502 is further configured to: input the voice information into a pre-trained user category recognition model, and determine the user category to which the user belongs according to an output of the user category recognition model.

In some alternative implementations of this embodiment, the response unit 503 is further configured to: analyze semantics of the voice information; determine response information matching the semantics; and play the response information using the voice.

In some alternative implementations of this embodiment, the response unit 503 is further configured to: determine whether the voice information includes a polite term; and play, in response to determining the voice information including the polite term, a preset polite term using the voice.

In some alternative implementations of this embodiment, the voice refers to synthetic voice or pre-recorded voice, and the synthetic voice is synthesized based on a voice parameter matching the user category.

In some alternative implementations of this embodiment, the user category refers to a child user, and the apparatus further includes a pushing unit 504. The pushing unit 504 is configured to: push multimedia information matching the child user to the user.

Figure 6:
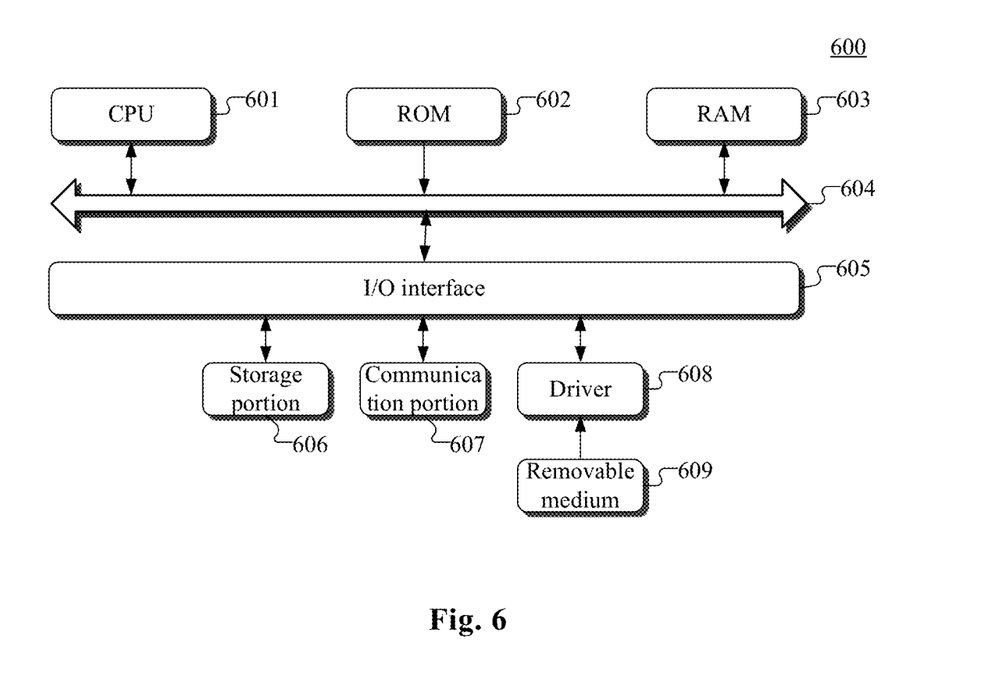
FIG. 6 is a schematic structural diagram of a computer system adapted to implement an electronic device according to the embodiments of the present disclosure.

As shown in FIG. 6, a computer system 600 includes a central processing unit (CPU) 601, which may execute various appropriate actions and processes in accordance with a program stored in a read-only memory (ROM) 602 or a program loaded into a random access memory (RAM) 603 from a storage portion 606. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: a storage portion 606 including a hard disk and the like; and a communication portion 607 including a network interface card such as a LAN (local area network) card and a modem. The communication portion 607 performs communication processes via a network such as the Internet. A driver 608 is also connected to the I/O interface 605 as required. A removable medium 609 such as a magnetic disk, an optical disk, a magneto-optical disk, and a semiconductor memory may be installed on the driver 608, to facilitate the retrieval of a computer program from the removable medium 609, and the installation thereof on the storage portion 606 as needed.

In particular, according to embodiments of the present disclosure, the process described above with reference to the flow chart may be implemented as a computer software program. For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication portion 607, and/or may be installed from the removable medium 609. The computer program, when executed by the central processing unit (CPU) 601, implements the above mentioned functionalities defined in the method of the present disclosure. It should be noted that the computer readable medium in the present disclosure may be a computer readable signal medium, a computer readable storage medium, or any combination of the two. For example, the computer readable storage medium may be, but not limited to: an electronic, magnetic, optical, electromagnetic, infrared, or semiconductor system, apparatus, or element, or any combination of the above. A more specific example of the computer readable storage medium may include, but not limited to: an electrical connection having one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs, which may be used by a command execution system, apparatus or element or incorporated thereto. In the present disclosure, the computer readable signal medium may include a data signal that is propagated in a baseband or as a part of a carrier wave, which carries computer readable program codes. Such propagated data signal may be in various forms, including, but not limited to, an electromagnetic signal, an optical signal, or any suitable combination of the above. The computer readable signal medium may also be any computer readable medium other than the computer readable storage medium. The computer readable medium is capable of transmitting, propagating or transferring programs for use by, or used in combination with, a command execution system, apparatus or element. The program codes contained on the computer readable medium may be transmitted with any suitable medium including, but not limited to, wireless, wired, optical cable, RF medium, or any suitable combination of the above.

A computer program code for executing the operations according to the present disclosure may be written in one or more programming languages or a combination thereof. The programming language includes an object-oriented programming language such as Java, Smalltalk and C++, and further includes a general procedural programming language such as "C" language or a similar programming language. The program codes may be executed entirely on a user computer, executed partially on the user computer, executed as a standalone package, executed partially on the user computer and partially on a remote computer, or executed entirely on the remote computer or a server. When the remote computer is involved, the remote computer may be connected to the user computer through any type of network, including a local area network (LAN) or a wide area network (WAN), or be connected to an external computer (e.g., connected through Internet provided by an Internet service provider).

The flowcharts and block diagrams in the accompanying drawings illustrate architectures, functions and operations that may be implemented according to the system, the method, and the computer program product of the various embodiments of the present disclosure. In this regard, each of the blocks in the flowcharts or block diagrams may represent a module, a program segment, or a code portion, the module, the program segment, or the code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed substantially in parallel, or they may sometimes be executed in a reverse sequence, depending on the function involved. It should also be noted that each block in the block diagrams and/or flowcharts as well as a combination of blocks may be implemented using a dedicated hardware-based system executing specified functions or operations, or by a combination of dedicated hardware and computer instructions.

The units involved in the embodiments of the present disclosure may be implemented by means of software or hardware. The described units may also be provided in a processor. For example, the processor may be described as: a processor comprising a receiving unit, a determining unit and a response unit. The names of these units do not in some cases constitute a limitation to such units themselves. For example, the receiving unit may alternatively be described as "a unit for receiving voice information sent through a client by a user."

In another aspect, the present disclosure further provides a computer readable medium. The computer readable medium may be the computer readable medium included in the apparatus described in the above embodiments, or a stand-alone computer readable medium not assembled into the apparatus. The computer readable medium carries one or more programs. The one or more programs, when executed by the apparatus, cause the apparatus to: receive voice information sent through a client by a user; determine, based on the voice information, a user category to which the user belongs; and answer the voice information using voice matching the user category.

The above description is only an explanation for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. A response method, wherein the method comprises:
   receiving voice information sent through a client by a user;
   determining, based on the voice information, an output user category to which the user belongs, wherein voices and voice parameters matching user categories are pre-stored, the voice parameters comprising at least one of a sound spectrum, a fundamental frequency, a pitch, or a sound intensity; and
   using a voice matching the output user category to respond to the voice information, wherein the using the voice matching the output user category to respond to the voice information comprises:
   determining that the voice information includes a polite term, and
   playing a preset polite term expressing thanks by using the voice, in response to determining the voice information including the polite term, wherein the using the voice matching the output user category to respond to the voice information comprises:
   analyzing semantics of the voice information;
   acquiring a plurality of pieces of chat information from the Internet;
   determining, from the plurality of pieces of chat information, conversation information including semantics identical to the semantics of the voice information;
   extracting a response from the conversation information; and
   playing the response using the voice.

2. The method according to claim 1, wherein the determining, based on the voice information, an output user category to which the user belongs comprises:
   inputting the voice information into a pre-trained user category recognition model, and determining the output user category to which the user belongs according to an output of the user category recognition model.

3. The method according to claim 1, wherein the using voice matching the user category to respond to the voice information comprises:
   analyzing semantics of the voice information;
   determining response information matching the semantics; and
   playing the response information using the voice.

4. The method according to claim 1, wherein the output user category refers to a child user, and the method further comprises:
   pushing multimedia information matching the child user to the user.

5. A response apparatus, wherein the apparatus comprises:
   at least one processor; and
   a memory storing instructions, wherein the instructions when executed by the at least one processor, cause the at least one processor to perform operations, the operations comprising:
   receiving voice information sent through a client by a user;
   determining, based on the voice information, an output user category to which the user belongs, wherein voices and voice parameters matching user categories are pre-stored, the voice parameters comprising at least one of a sound spectrum, a fundamental frequency, a pitch, or a sound intensity; and
   using a voice matching the output user category to respond to the voice information, wherein the using the voice matching the output user category to respond to the voice information comprises:
   determining that the voice information includes a polite term, and
   playing a preset polite term expressing thanks by using the voice, in response to determining the voice information including the polite term, wherein the using the voice matching the output user category to respond to the voice information comprises:
   analyzing semantics of the voice information;
   acquiring a plurality of pieces of chat information from the Internet;
   determining, from the plurality of pieces of chat information, conversation information including semantics identical to the semantics of the voice information;
   extracting a response from the conversation information; and
   playing the response using the voice.

6. The apparatus according to claim 5, wherein the determining, based on the voice information, an output user category to which the user belongs comprises:
   inputting the voice information into a pre-trained user category recognition model, and determine the output user category to which the user belongs according to an output of the user category recognition model.

7. The apparatus according to claim 5, wherein the using voice matching the user category to respond to the voice information comprises:
   analyzing semantics of the voice information;
   determining response information matching the semantics; and
   playing the response information using the voice.

8. The apparatus according to claim 5, wherein the output user category refers to a child user, and the operations further comprise:
   pushing multimedia information matching the child user to the user.

9. A non-transitory computer readable medium, storing a computer program, wherein the program, when executed by a processor, causes the processor to perform operations, wherein the operations comprise:
   receiving voice information sent through a client by a user;
   determining, based on the voice information, an output user category to which the user belongs, wherein voices and voice parameters matching user categories are pre-stored, the voice parameters comprising at least one of a sound spectrum, a fundamental frequency, a pitch, or a sound intensity; and using a voice matching the output user category to respond to the voice information, wherein the using the voice matching the output user category to respond to the voice information comprises:

determining that the voice information includes a polite term, and playing a preset polite term expressing thanks by using the voice, in response to determining the voice information including the polite term, wherein the using the voice matching the output user category to respond to the voice information comprises:

analyzing semantics of the voice information;

acquiring a plurality of pieces of chat information from the Internet;

determining, from the plurality of pieces of chat information, conversation information including semantics identical to the semantics of the voice information;

extracting a response from the conversation information; and playing the response using the voice.

10. The method according to claim 1, wherein the output voice parameter includes the sound spectrum, the fundamental frequency, the pitch, and the sound intensity, matching the output user category.

11. The method according to claim 1, wherein an interval corresponding to an acoustic characteristic having a commonality for a plurality of users in a given age range is acquired in advance by performing statistics, wherein the determining comprising: extracting a characteristic value of an acoustic characteristic of a user, determining that the interval includes the characteristic value, and determining the user category to which the user belongs based on the given age range, wherein the acoustic characteristic includes a time length, a fundamental frequency, energy, a formant frequency, wideband, a frequency perturbation, an amplitude perturbation, a zero-crossing rate, and a Mel frequency cepstral parameter.

12. The method according to claim 1, wherein the using comprises: determining an output voice and an output voice parameter matching the output user category from the voices and the voice parameters matching user categories, and outputting the output voice with the output voice parameter, wherein the output voice parameter includes a sound spectrum, a fundamental frequency, a pitch, and a sound intensity, matching the output user category, and the output voice with the output voice parameter sounds identical or similar to a true voice of the user of the output user category.

* * * * *

UNITED STATES PATENT AND TRADEMARK OFFICE
CERTIFICATE OF CORRECTION

PATENT NO. : 11,475,897 B2
APPLICATION NO. : 16/505648
DATED : October 18, 2022
INVENTOR(S) : Wenyu Wang It is certified that error appears in the above-identified patent and that said Letters Patent is hereby corrected as shown below:

On the Title Page

Item (73) Assignee:
"BAIDU ONLINE NETWORK TECHNOLOGY (BEIJING) CO., LTD., Beijing (CN)"
Should read:
-- BAIDU ONLINE NETWORK TECHNOLOGY (BEIJING) CO., LTD., Beijing CN and SHANGHAI XIAODU TECHNOLOGY CO. LTD., Shanghai (CN) --

Signed and Sealed this
Second Day of May, 2023

Katherine Kelly Vidal
*Director of the United States Patent and Trademark Office*